(12) United States Patent
Riggs et al.

(10) Patent No.: US 10,301,889 B2
(45) Date of Patent: May 28, 2019

(54) DYNAMIC RISER MECHANICAL CONNECTOR

(71) Applicant: SINGLE BUOY MOORINGS, INC., Marly (CH)

(72) Inventors: David C. Riggs, Aberdeen (GB); Alpha Mahatvaraj, Aberdeen (GB); Chandrashekhar Joshi, Aberdeen (GB); Nagarjuna Jillella, Aberdeen (GB)

(73) Assignee: SINGLE BUOY MOORINGS, INC., Marly (CH)

( * ) Notice: Subject to any disclaimer, the term of this patent is extended or adjusted under 35 U.S.C. 154(b) by 0 days.

(21) Appl. No.: 15/510,329

(22) PCT Filed: Sep. 11, 2015

(86) PCT No.: PCT/US2015/049782
§ 371 (c)(1),
(2) Date: Mar. 10, 2017

(87) PCT Pub. No.: WO2016/040863
PCT Pub. Date: Mar. 17, 2016

(65) Prior Publication Data
US 2017/0298699 A1 Oct. 19, 2017

Related U.S. Application Data

(60) Provisional application No. 62/049,947, filed on Sep. 12, 2014.

(51) Int. Cl.
*E02B 17/00* (2006.01)
*E21B 33/038* (2006.01)
(Continued)

(52) U.S. Cl.
CPC .......... *E21B 17/085* (2013.01); *E21B 17/046* (2013.01); *E21B 19/004* (2013.01);
(Continued)

(58) Field of Classification Search
CPC ...... E21B 33/038; E21B 33/076; E21B 17/01; E21B 33/043; E21B 33/035
(Continued)

(56) References Cited

U.S. PATENT DOCUMENTS 2,628,111 A * 2/1953 Smalline .................. F16L 19/06
285/310
4,009,893 A * 3/1977 Schatton ............... E21B 17/042
285/110
(Continued)

OTHER PUBLICATIONS

WOODCO USA, Ring Gasket Profile Design (Types) Illustrated and Explained, Dec. 30, 2013 [retrieved on Oct. 27, 2015] Retrieved from the Internet: URL: https://web.archive.org/web/20131230130359/http://www.woodcousa.com/catalogs/connector-a-cc14.htm> entire document.
(Continued)

*Primary Examiner* — Benjamin F Fiorello
*Assistant Examiner* — Edwin J Toledo-Duran
(74) *Attorney, Agent, or Firm* — Young & Thompson

(57) ABSTRACT

High-strength, fatigue-resistant pipe connectors suitable for use in offshore risers, tendons and pipelines, such as may be connected to floating production systems (FPSs) principally used in the production of oil and gas. The present connectors include tubular pin and box components with mating frusto-conical, concentrically-grooved mating surfaces which threadingly interlock, and non-threaded (e.g., flat) mating surfaces that seal and preload (e.g., preload at least a portion of each component in compression), via axial advancement of the pin component into the box component. In such connectors, axial movement of the pin into the mating box
(Continued)

results the in radial expansion of the box and radial contraction of the pin until the concentric thread patterns match and interlockingly snap into the connected position.

30 Claims, 10 Drawing Sheets

(51) Int. Cl.
    *E21B 17/08* (2006.01)
    *E21B 17/046* (2006.01)
    *E21B 19/00* (2006.01)
    *F16L 15/00* (2006.01)
    *E21B 17/00* (2006.01)

(52) U.S. Cl.
    CPC ............ *F16L 15/004* (2013.01); *E21B 17/00* (2013.01); *E21B 19/00* (2013.01)

(58) Field of Classification Search
    USPC ....... 166/338, 339, 340, 341, 344, 345, 348, 166/351, 360, 377, 378, 367, 355, 359
    See application file for complete search history.

(56) References Cited

U.S. PATENT DOCUMENTS

| | | | | |
|---|---|---|---|---|
| 4,426,104 A * | 1/1984 | Hazelrigg | ............ | E21B 43/013 285/26 |
| 4,441,740 A * | 4/1984 | Cowan | ................. | E21B 33/038 285/18 |
| 4,629,221 A * | 12/1986 | Lumsden | ................ | E02D 5/523 285/328 |
| 4,708,376 A * | 11/1987 | Jennings | ............... | E21B 33/038 285/18 |
| 4,815,770 A * | 3/1989 | Hyne | .................... | E21B 33/043 277/322 |
| 4,893,842 A * | 1/1990 | Brammer | ............... | E21B 33/038 285/24 |
| 5,934,709 A * | 8/1999 | Morrison | ............. | F16L 37/0842 285/315 |
| 5,964,486 A * | 10/1999 | Sinclair | ................. | F16L 15/004 285/331 |
| 6,068,427 A * | 5/2000 | Ostergaard | ............ | E21B 33/035 166/345 |
| 6,237,964 B1* | 5/2001 | Ostergaard | ............ | E21B 33/035 285/310 |
| 6,293,343 B1* | 9/2001 | Pallini, Jr. | ............. | E21B 33/038 166/345 |
| 6,964,435 B2* | 11/2005 | Wolf | ..................... | F16L 37/084 285/320 |
| 7,011,345 B2* | 3/2006 | Foos | ..................... | F16L 21/035 285/224 |
| 7,331,395 B2* | 2/2008 | Fraser | ..................... | E21B 17/01 166/344 |
| 7,686,342 B2* | 3/2010 | Jennings | ............... | E21B 17/085 285/323 |
| 7,878,551 B2* | 2/2011 | McHugh | .............. | F16L 37/002 285/308 |
| 7,913,767 B2* | 3/2011 | Larson | ................. | E21B 17/085 166/242.6 |
| 8,056,940 B2* | 11/2011 | Morgan | ................ | E21B 17/046 285/382.2 |
| 9,097,091 B2* | 8/2015 | McHugh | ................ | E21B 34/04 |
| D816,811 S * | 5/2018 | Dagdelen | .................... | D23/259 |
| 2013/0033035 A1* | 2/2013 | Gallagher | ............... | D05B 3/02 285/332.2 |

OTHER PUBLICATIONS

International Search Report, dated Dec. 4, 2015, from corresponding PCT application.

* cited by examiner

DYNAMIC RISER MECHANICAL CONNECTOR

PRIORITY CLAIM

This application claim priority to U.S. Provisional Patent Application No. 62/049,947 filed Sep. 12, 2014, which is incorporated by reference in its entirety.

BACKGROUND

1. Field of Invention

The present invention relates generally to high-strength, fatigue-resistant pipe connectors for pipelines; and, more specifically but not by way of limitation, to high-strength, fatigue-resistant pipe connectors for offshore risers and pipelines, such as, for example, those connected to floating production systems (FPSs) principally used in the offshore production of oil and gas.

2. Description of Related Art

Certain concentrically (e.g., non-helical) threaded pin-and-box connector systems are known in the art for connecting large-diameter (e.g., 12 to 36 inch) offshore tendon and riser pipes. Such connector systems, however, have proven difficult to adapt to smaller-diameter (e.g., 6 or 8 inch) pipes. For example, the pin and box of such connectors systems are typically engaged and disengaged by providing hydraulic fluid under high pressure (typically 5,000 to 10,000 psi) in the threaded annulus between the pin and box, thereby expanding the box and contracting the pin in their respective threaded diameters. As the connector design becomes smaller in diameter, the connector hoop stresses increase proportionally for radial thread displacement. Therefore, the required thread disengagement of such smaller-diameter connector systems may exceed the yield strength of materials (e.g., common steel alloys) that are typically used for such connectors. While higher-strength alloys and materials may be used for such connectors, their use may be impractical. For example, such materials may be incompatible with pipeline fluids, environmental conditions (e.g., seawater), or may be difficult to weld to the common alloys that are typically used for connected pipe.

One example of a pipe connector is disclosed in U.S. Pat. No. 8,056,940.

SUMMARY

This disclosure includes embodiments of connector systems

The present apparatuses provide a new and useful high-strength and fatigue-resistant pipe connector for pipelines that is simpler in construction, more universally usable in various applications, and more versatile in operation than previously known connectors.

In some embodiments, the present connectors include a pin component and box component each including mating frusto-conical, concentrically (non-helically) grooved or threaded mating surfaces configured to threadingly interlock the pin and box components, and flat mating surfaces that seal and preload via the axial advancement of the pin into the box. In at least some embodiments, axial movement of the pin into the tapered mating box results in the radial expansion of the box and radial contraction of the pin until the concentric thread patterns match and interlockingly snap into the connected position, such that upon snap engagement, the connector is sealed and preloaded at the abutment shoulders of the outer diameter (OD) and inner diameter (ID) of the pin and box. In at least some embodiments, contoured radial protrusions in the OD and/or ID of the box component, and/or in the OD of the pin component are included to strengthen and control radial compliance of the respective components so that the connector walls are not overstressed by hydraulic pressurized-displacement employed during connection or disconnection. In at least some embodiments, a wedge-shaped, resilient ring (e.g., elastically deformable under pressures and forces applied during connection or disconnection of the box and pin components) is configured to be disposed at (e.g., and at least partially aligned with) the ID of the connector to accommodate axial movement during connector make-up and effect a seal in the connector ID.

Some embodiments of the present connector systems comprise: a pin component defining a hollow interior region with a substantially constant first inner diameter (ID) between a proximal end of the pin component and a seal portion adjacent a distal end of the pin component, and having a tapered exterior surface with a plurality of teeth, the seal portion having a second ID that is larger than the first ID of the pin component; and a box component having a tapered interior surface with a plurality of teeth configured to engage the teeth of the pin component, and having an exterior surface that has a first portion having a substantially constant first outer diameter (OD) extending along a majority of the length of the box component, and a second contoured portion having a variable OD that varies between the first portion and a distal end of the box component.

Some embodiments of the present connector systems further comprise: a seal ring having an OD and configured to be disposed in the ID seal portion of the pin component such that an OD of the seal ring abuts the second ID of the pin component. In some embodiments, the seal ring includes an inner surface with a first width, an outer surface with a second width that is smaller than the inner surface, and two angled lateral surfaces extending between the inner surface and outer surface. In some embodiments, the lateral surfaces are at mirrored angles of equal magnitude relative to an axis that bisects each of the upper and lower surfaces. In other embodiments, the seal ring includes an inner surface with a first width, an outer surface that is parallel to the inner surface, and two lateral surfaces that are each perpendicular to the inner surface and outer surface. In some of these other embodiments, a fillet joins the outer surface and one of the lateral surfaces.

In some embodiments of the present connector apparatuses, the seal portion of the pin component includes an annular, longitudinal protrusion with a radially inner surface defining the second ID. In some embodiments, a proximal end of the box component includes an annular, longitudinal ID seal groove configured to receive the protrusion of the ID seal portion. In some embodiments, the ID seal groove is configured to receive the protrusion of the ID seal portion with an interference fit.

In some embodiments of the present connector apparatuses, the distal end of box component includes an OD seal portion having a second OD that is smaller than the first OD of the box to define an annular, longitudinal protrusion. In some embodiments, a proximal end of the pin component includes an annular, longitudinal OD seal groove configured to receive the protrusion of the OD seal portion. In some embodiments, the OD seal groove is configured to receive the longitudinal protrusion of the OD seal portion with an interference fit.

In some embodiments of the present connector apparatuses, the variable OD of the second portion of the box component first increases with distance away from the first OD of the first portion of the box component to a maximum variable OD, and then decreases with further distance from the first OD of the first portion to a minimum variable OD. In some embodiments, the minimum variable OD is substantially equal to the first OD of the first portion of the box component. In some embodiments, a sidewall of the box component along the portion in which the variable OD decreases has a substantially constant thickness between the maximum variable OD and the ID seal portion. In some embodiments, the sidewall of the box component has a substantially constant thickness between the first OD and the ID seal portion In some embodiments of the present connector apparatuses, the plurality of teeth of each of the pin component and the box component comprise concentric, non-helical threads. In some embodiments, the teeth of the pin component are configured to engage the teeth of the box component to attaches the pin component to the box component. In some embodiments, the teeth of the pin and box components are configured to be disengaged by pressurization between the external surface of the pin component and the internal surface of the box component. Some embodiments further comprise: a pressurization component configured to pressurize an interface between the exterior surface of the pin component and the interior surface of the box component.

In general, the foregoing embodiments provide a high-strength, fatigue-resistant pipe connector that can overcome deficiencies in the prior art devices. For example, the foregoing embodiments can be configured or adapted for use with nominal pipe diameters of 8 inches and smaller (e.g., 6 inches), and/or may be stronger than the pipe segments it connects (e.g., even when used with any larger diameter pipe). As another example, the foregoing embodiments may be especially suitable with pipelines, catenary and vertical risers that may be subject to torsional loads, in that the present embodiments are not susceptible to disengagement unscrewing due to rotation, and includes an ID seal to reduce the likelihood of leaks due to interior corrosion. As further examples, the present embodiments can permit the use of suitable grades of steel (such as are commonly used for riser pipe connectors) that is: practical to weld to common riser pipe materials; less likely to react unfavorably with pipeline fluids or the subsea environment; and/or can withstand very high internal fluid pressures of 5,000-10,000 and up to 20,000 psi (e.g., 14,000-17,000 psi, or 15,000-16,000 psi). Additionally, the present embodiments can be made-up more quickly than welding connections on location, can be quickly disconnected and reconnected multiple times on location, is preloaded to resist fatigue and has a fatigue life that significantly greater than welded connections, and/or is usable in a wider variety of applications that prior art connections.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, 10, and 20 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DETAILED DESCRIPTION OF ILLUSTRATIVE EMBODIMENTS

A mechanical connector for static and dynamic riser applications comprised of a tubular pipe pin and box connector. The pin and box contain mating frusto-conical and flat, concentrically-grooved mating surfaces which threadingly interlock, seal and preload via the axial advancement of the pin into the box. Axial movement of the pin into the tapered mating box results the in radial expansion of the box and radial contraction of the pin until the concentric thread patterns match and interlockingly snap into the connected position. Upon snap engagement, the connector is sealed and preloaded at the abutment shoulders of the OD and ID of the pin and box. Contoured radial protrusions in the OD and/or ID of the connector strengthen and control radial compliance so that the connector walls are not overstressed during connection or disconnection. A wedge- or rectangularly shaped (cross-section), flexibly (e.g., resiliently) compliant ring in the connector ID accommodates axial movement during connector make-up and effects a seal in the connector ID.

Referring now the drawings, and more particularly to FIGS. 1-7, an embodiment of the present dynamic riser mechanical connectors is shown.

Figure 1:
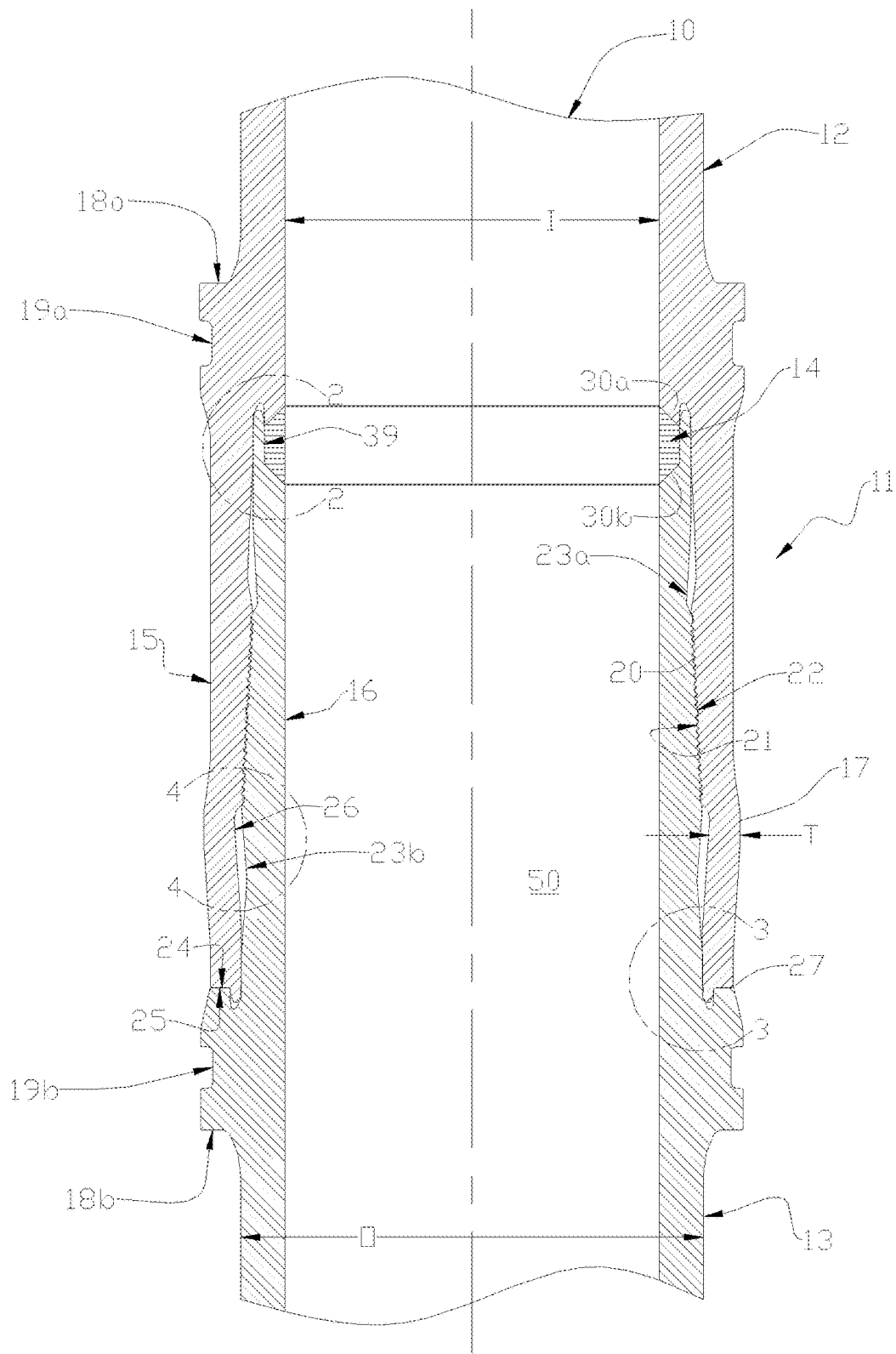
FIG. 1 is a cross-sectional view of an embodiment of the present pin-and-box connector apparatuses in a connected or made-up configuration.

FIG. 1 illustrates a cross-sectional view of an embodiment of a dynamic riser mechanical connector, high strength fatigue resistant pipe connector for offshore risers and pipelines, such as may be connected to floating production systems (FPSs) principally used in the production of oil and gas. In the embodiment shown, adjacent segments 12, 13 of a pipe string 10 are joined by a pipeline connector 11 that comprises a box 15, pin 16, and a seal (ring) 14. In the embodiment shown, seal ring 14 includes an inner surface (facing the interior of pin 16 and pipe string 10) with a first width, an outer surface 39 with a second width that is smaller than the inner surface, and two angled lateral surfaces 28a, 28b extending between the inner surface and outer surface. In this embodiment, lateral surfaces 28a, 29a are at mirrored angles of equal magnitude relative to an axis that bisects each of the upper and lower surfaces. The pipe string would typically have an OD dimension O of 6⅝ inches to 24 inches with an inner diameter (ID) I defined by the pipe string wall thickness typically ranging from ½ inch to 2 inches, and may be configured to carry and/or contain pressurized fluids 50 such as oil, gas and/or water. In this embodiment, box 15 includes concentric (non-helical) internal threads 21, and pin 16 includes concentric (non-helical) external threads 22 that are configured to engage (as indicated at reference numeral 20) threads 21 of box 15 as shown. As shown, these threads (20, 21) are each defined by a plurality of grooves cut or otherwise formed in a frusto-conical surface (or otherwise shaped in the depicted frusto-conical profiles). While not depicted in the figures, the connector (e.g., at least box 15) further includes at least one port through which hydraulic fluid can be delivered to pressurize the space between the box and the pin to disengage the two, as is known in the art for other axial makeup pin-and-box connectors.

In the embodiment shown, box 15 and pin 16 can comprise steels (e.g., common steel alloys) that are typically used for such connectors, and seal ring 14 may comprise the same material the box 15 and/or pin 16 (e.g., low alloy steel, C—Mn steel, plain carbon steel, titanium alloy, aluminum alloy, etc.) or can comprise a dissimilar material such as CRA (corrosion resistant alloy, e.g., Inconel 625, Incoloy 825, 316 stainless steel, 309 stainless steel, etc.) or a dissimilar CRA that is selected for additional compliance (e.g., titanium alloy) with a strength that is comparable to the connector, but an elastic modulus that is lower than steel.

In the embodiment shown, the pin and box components of connector 11 incorporate shoulders 18a, 18b for handling and support of the pipe string adjacent to respective clamping grooves 19a, 19b that are used for engaging a make-up tool that can be used to axially force the pin and box members together. Make-up of the connector system forcibly preloads the connector outer abutments 24, 25 and internal tapered abutment seal interfaces 30a, 30b (between upper and lower surfaces 28a, 28b of seal 14 and corresponding surfaces 29a, 29b of box 15 and pin 16, respectively). As the depicted connector is designed for make-up via axial advancement of the conical box and pin together, the connector box is reinforced by one or more enlargements 17 of the box outer diameter (OD) to prevent plastic yielding as the box expands and pin contracts to slide the threads over the pin threads to achieve final engagement (20) between the threads (21, 22) and preloading of the abutting surfaces. In this embodiment, and as shown in more detail in FIG. 5, contour 26 (e.g., the inner or ID contour of the box along at least a portion of enlargement 17) of the box is configured to provide a constant thickness T of at least a portion of the reinforced box (e.g., the portion between threads 21 and the distal end of the box member (adjacent 27), whereby sufficient compliance is enabled without sacrificing the strength of the box. The outer diameter (OD) or outer surface of pin 16 includes stress-relief contouring (23a, 23b) configured to distribute axial and bending stresses transmitted in the pipe string 10.

Figure 2:
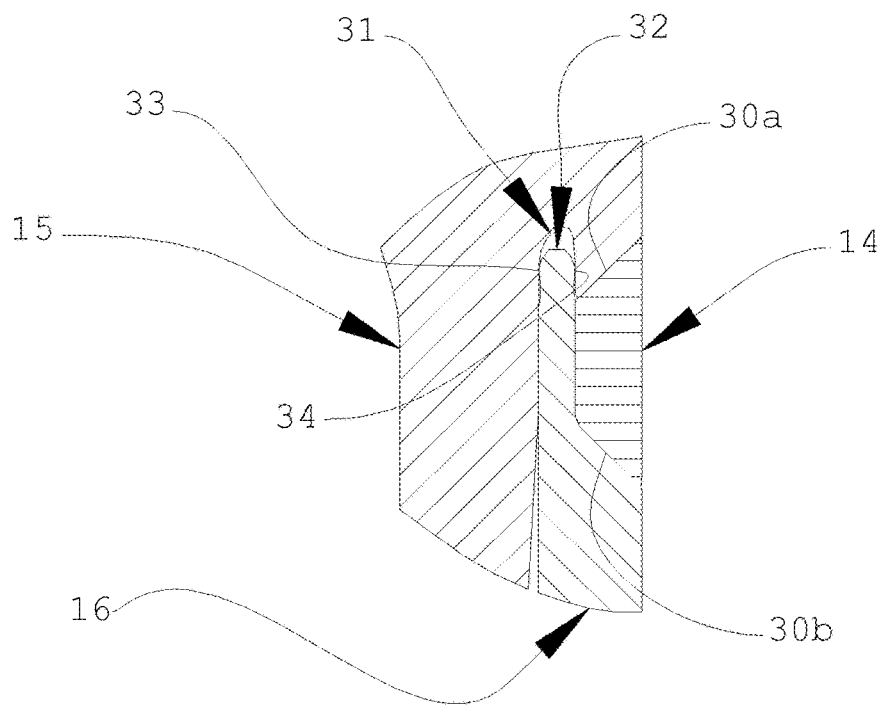
FIG. 2 is an enlarged cross-sectional view of portion 2-2 of the connector apparatus of FIG. 1.

An enlarged cross-sectional view of portion 2-2 (FIG. 1) of the connector is shown in FIG. 2. In this embodiment, pin 16 includes an ID nib seal 32 configured to be inserted into and have an interference fit within an inner nib seal groove 31 of box 15, thereby providing high pressure internal seal contacts 33, 34. In the embodiment shown, the ID high pressure seal (e.g., contacts 33, 34) are protected by a preloaded tapered seal 14, as shown, that is configured to be disposed in sealing contact at interfaces 30a, 30b when the connector system is in the mated configuration of FIG. 1, and thereby prevent particles of grit from the pipeline internal surface and fluids therein from reaching the nib seal. For example, seal 14 prevents the ingress and egress of fluids in the pipeline, thereby preventing crevice corrosion. In other embodiments, seal 14 may function as a stand-alone high pressure ID seal, thereby permitting the ID nib seals (31, 32) to be omitted altogether and the connector wall thickness to be minimized.

Figure 3:
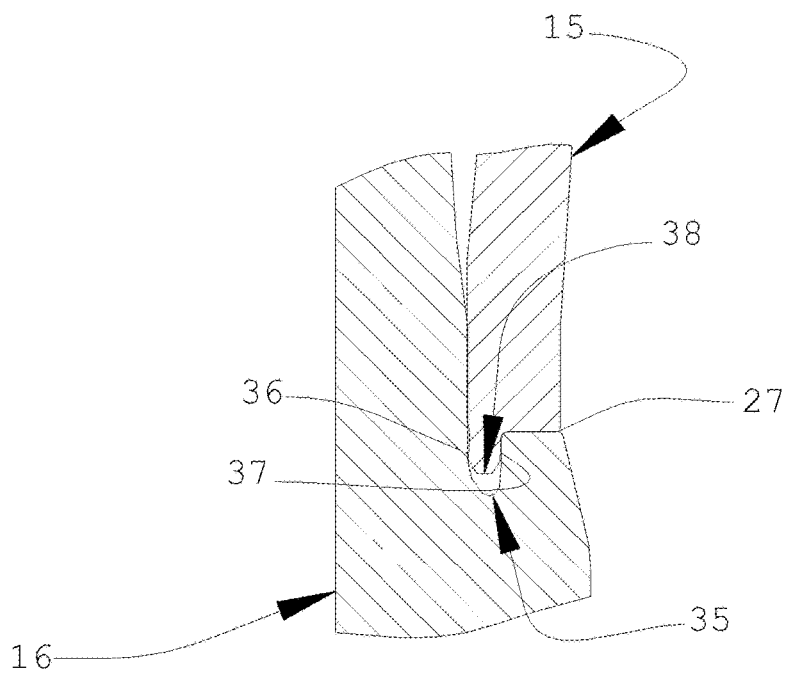
FIG. 3 is an enlarged cross-sectional view of portion 3-3 of the connector apparatus of FIG. 1.

An enlarged cross-sectional view of portion 3-3 (FIG. 1) of the connector is shown in FIG. 3. In this embodiment, box 15 includes and OD nib seal 38 configured to be inserted into and have an interference fit within an inner nib seal groove 35 of pin 16, thereby providing high pressure internal seal contacts 36, 37. In this embodiment, high pressure sealing contacts 36, 37 of the OD nib seal form the final barrier of redundant sealing for pressurized fluids within the pipe string. Additionally, in the embodiment shown, OD abutment surfaces 24, 25 (FIG. 1) between box 15 and pin 16 provide the main preloading reaction to the box and pin thread engagement (20), while stabilizing the OD nib seal (38) from fretting movement under dynamic loading conditions of the pipe string.

Figure 4:
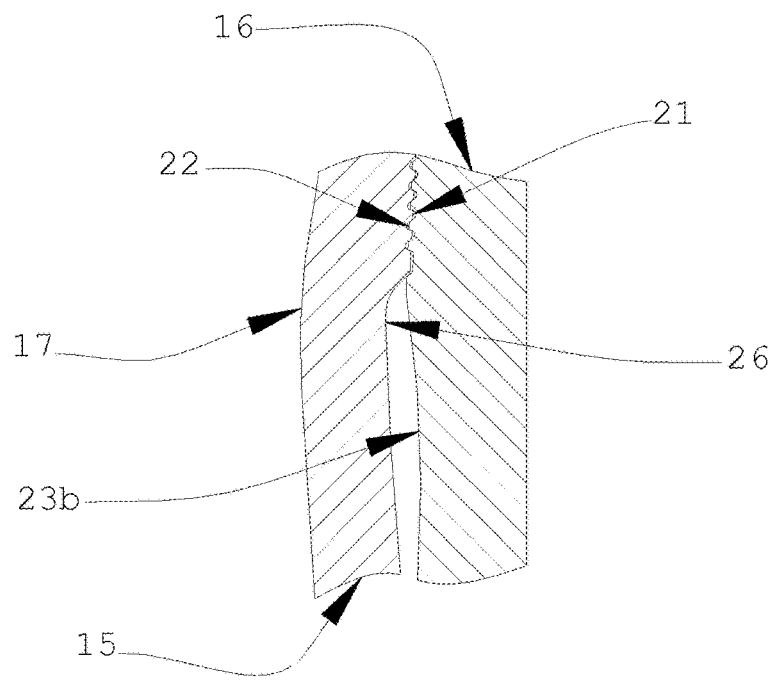
FIG. 4 is an enlarged cross-sectional view of portion 4-4 of the connector apparatus of FIG. 1.

An enlarged cross-sectional view of portion 4-4 (FIG. 1) of the connector is shown in FIG. 4. As shown in more detail, in this embodiment, contour 26 has a similar shape and thereby cooperates with OD enlargement 17 to define a constant thickness T along at least a portion of enlargement 17 (e.g., between threads 21 and a distal end of the box).

Figure 6:
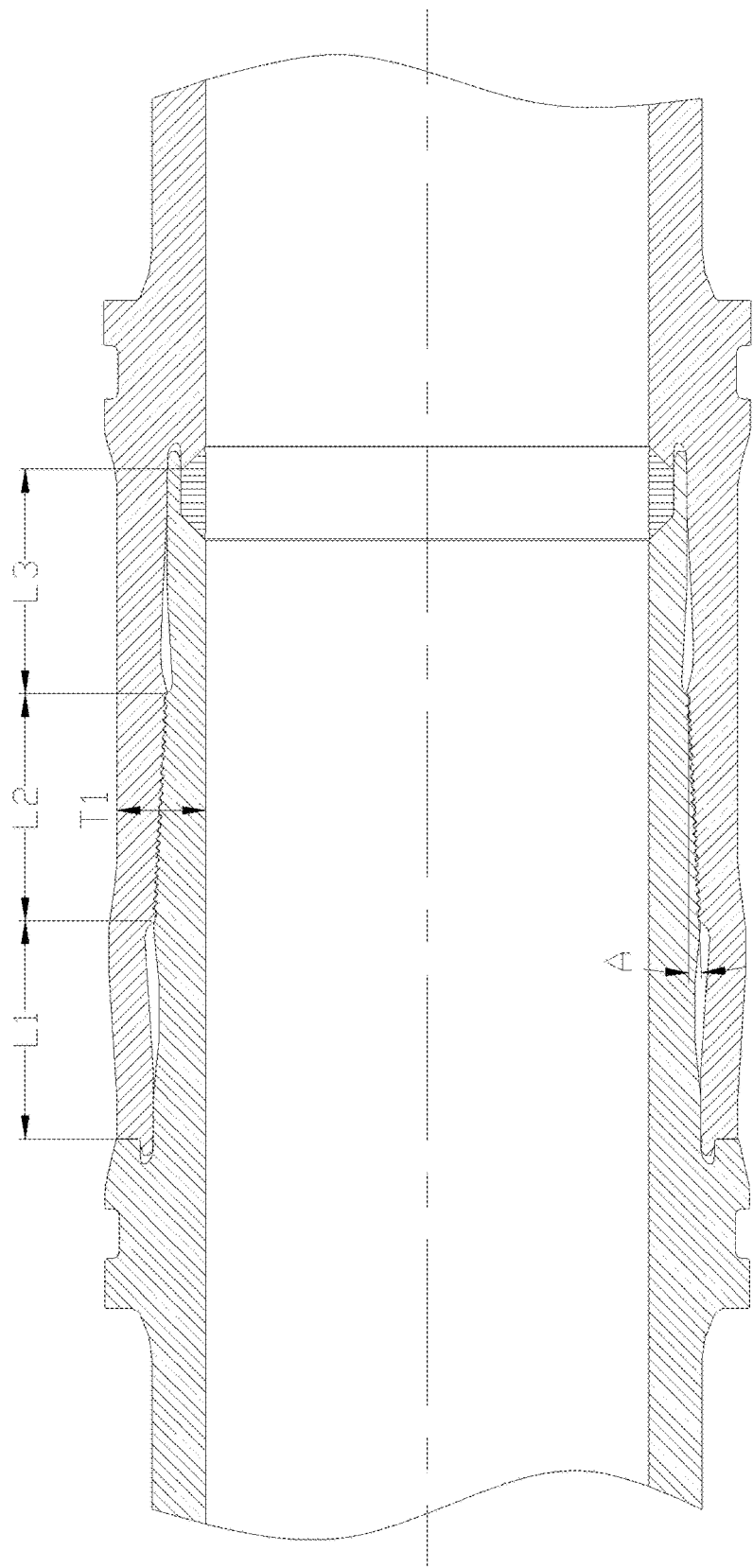
FIG. 6 is a cross sectional view of the connector assembly of FIG. 1 showing certain dimensional and geometric relationships.
Figure 7:
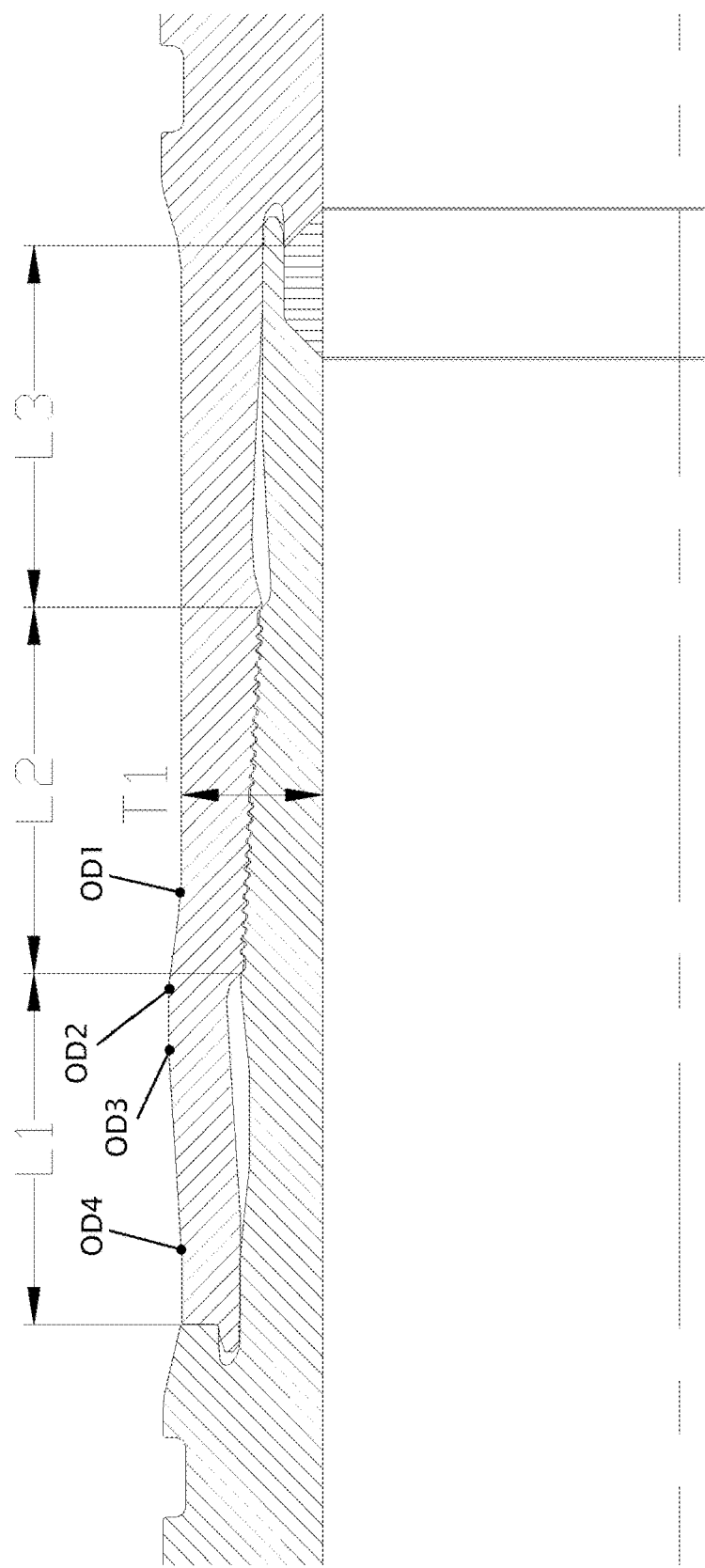
FIG. 7 is an enlarged a portion of the view of FIG. 6.
Figure 8:
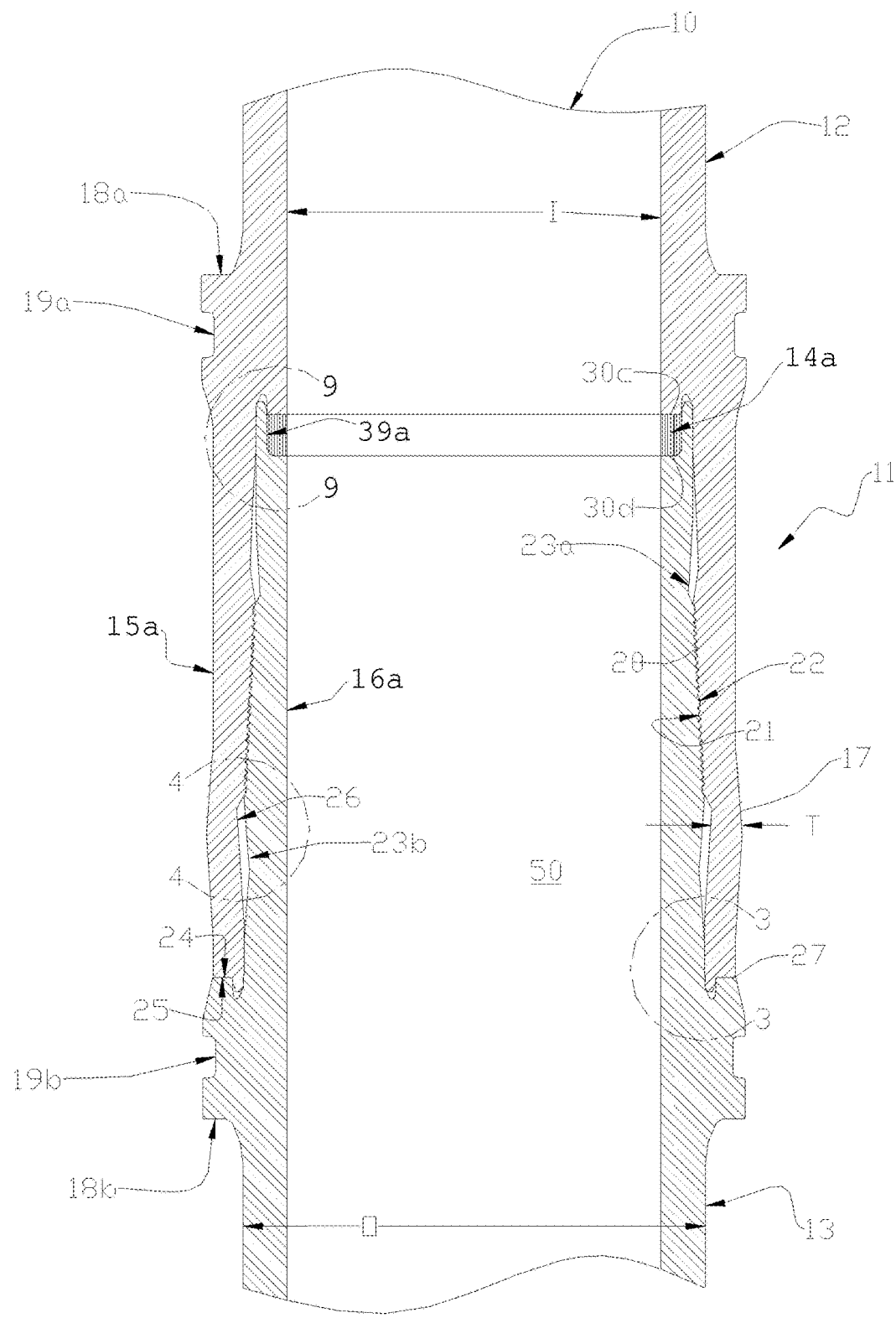
FIG. 8 is a cross-sectional view of a second embodiment of the present pin-and-box connector apparatuses in a connected or made-up configuration.
Figure 10:
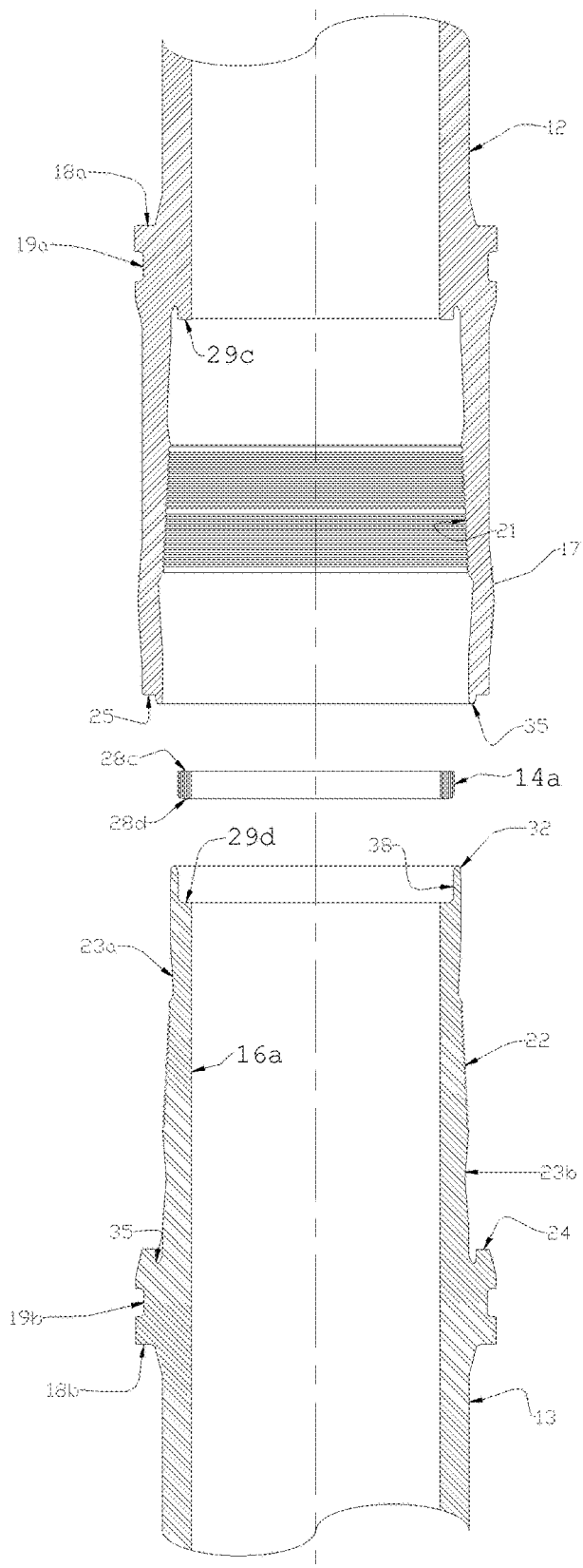
FIG. 10 is an exploded cross-sectional view of connector apparatus of FIG. 8.
Figure 11:
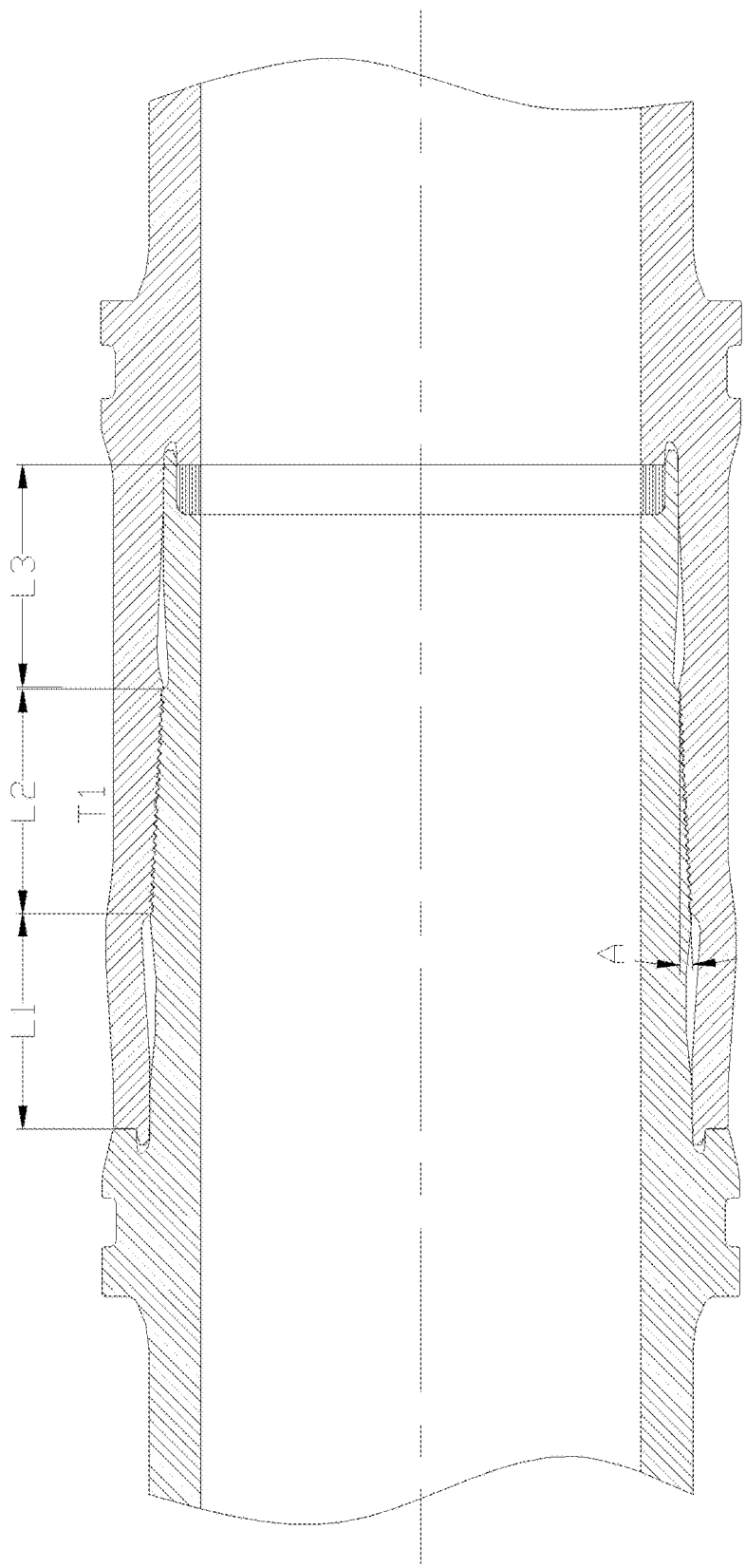
FIG. 11 is a cross sectional view of the connector assembly of FIG. 8 showing certain dimensional and geometric relationships.
Figure 12:
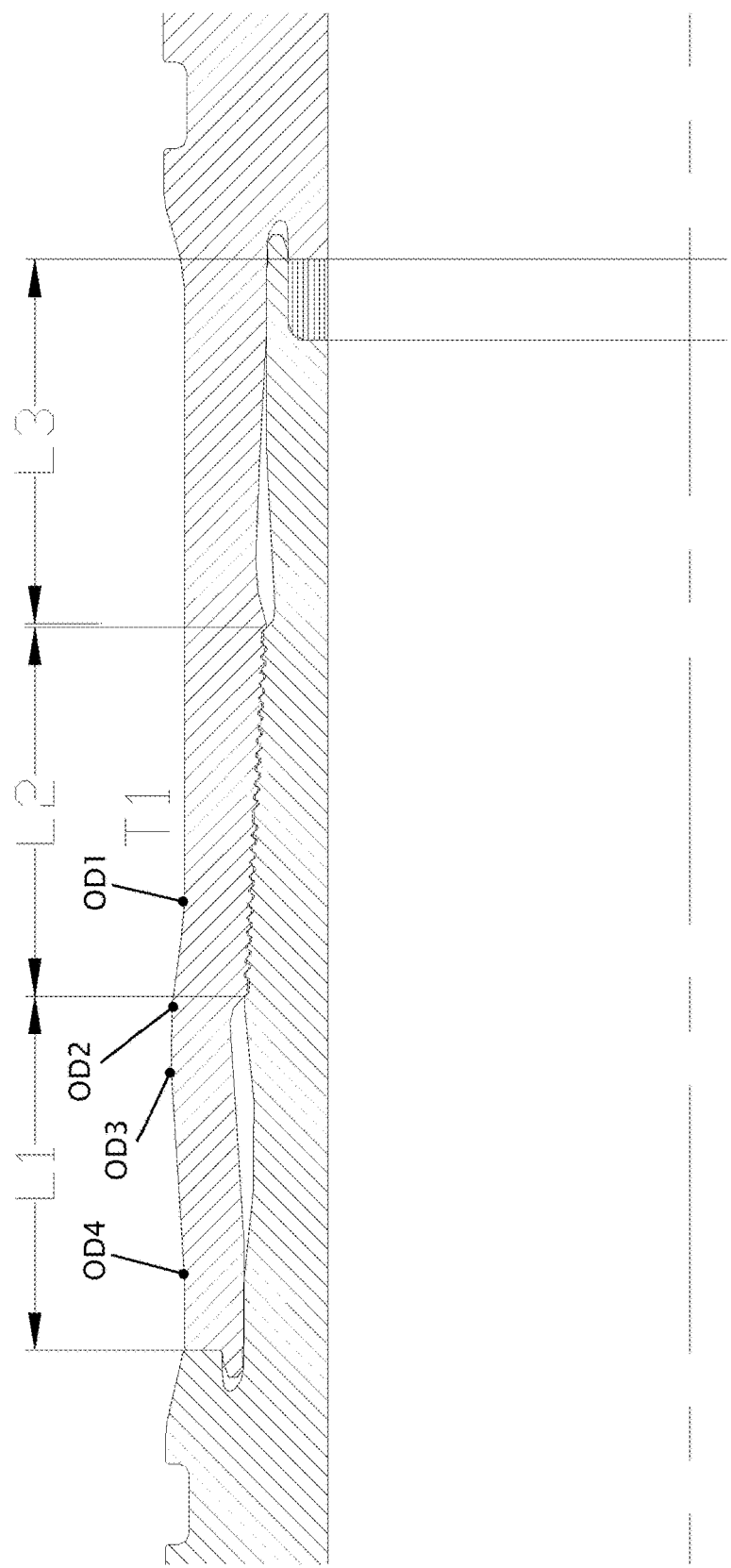
FIG. 12 is an enlarged a portion of the view of FIG. 8.

FIG. 6 depicts a cross sectional view showing the relative dimensions of various parts of the connector. For example, in at least some of the present embodiments, threads 21, 22 are conical with a taper angle A of 2 to 5 degrees (e.g., between any two of 2, 2.25, 2.5, 2.75, 3, 3.25, 3.5, 3.75, 4, 4.25, 4.5, 4.75, and 5 degrees, such as, for example: 2.5-3.5 degrees, 2.75-3.25 degrees, 3-4 degrees, 3.5-4.5 degrees, and/or the like). As shown, length L1 is the span length between the OD abutment 27 and start of threads 21, L2 is the length of the engaged threads 20, L3 is the span length between the start of threads 22 and ID abutment interface 30a (at the distal most portion of surface 29a), and T1 is the average ID to OD thickness through the conically engaged threads. In at least some of the present embodiments, the ratio of L2/T1 is 2 to 3 (e.g., between any two of 2, 2.2, 2.4, 2.6, 2.8, and/or 3, such as, for example, between 2.4 and 2.8, and/or the like), the ratios of L1/L2 and L3/L2 are no less than 0.9 (e.g., greater than any one of, or between any two of: 0.9, 0.95, 1.0, 1.1, 1.2, 1.3, 1.4, 1.5, 1.75, and/or 2), and the span lengths L1 and L3 are long enough to allow sufficient (and can be lengthened to increase) compliance for uniform separation and allowable stresses in the threads 21, 22 during connector make-up and break-out operations. In the depicted embodiment, the figures are drawn to scale and the pipeline 10 has a nominal diameter of 8⅝ inches. For example, in the depicted embodiment, threads 21, 22 taper at an angle A of 3±0.25 degrees, the ratio of L2/T1 is 2.6±0.2, the ratio of L1/L2 is 0.95±0.05, and the ratio of L3/L2 is 1±0.05.

In the embodiment shown, box 15 includes a first portion with a substantially constant first outer diameter (OD) extending along a majority of the length of the box (e.g., between groove 19a and protrusion 17) and a second portion (protrusion 17) with a variable OD that varies between (e.g., at least a portion of the length between) the first portion and a distal end of the box component. In the embodiment shown, protrusion 17 includes a variable OD (that varies along the length of protrusion 17). In this embodiment, the OD of box 15 first increases with distance away from the first OD of the first portion of the box component (e.g., from point OD1) to a maximum variable OD (e.g., to point OD2), and then decreases with further distance from the first OD of the first portion (e.g., from point OD3) to a minimum variable OD (e.g., at point OD4). In this embodiment, thickness T is substantially constant between point OD3 and the seal portion of box 15 (distal of point OD4). In other embodiments, protrusion 17 is distal of the threads and thickness T is constant along the entire length of protrusion 17.

Figure 9:
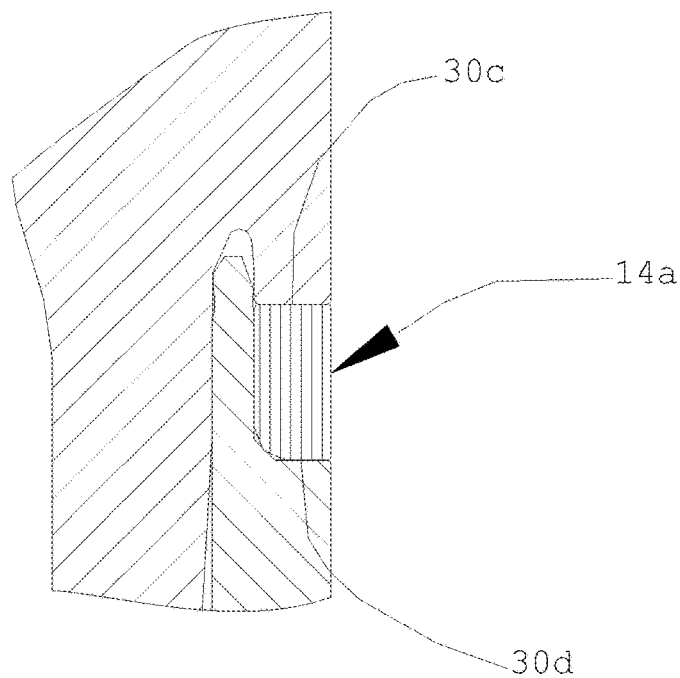
FIG. 9 is an enlarged cross-sectional view of portion 9-9 of the connector apparatus of FIG. 8.
Figure 5:
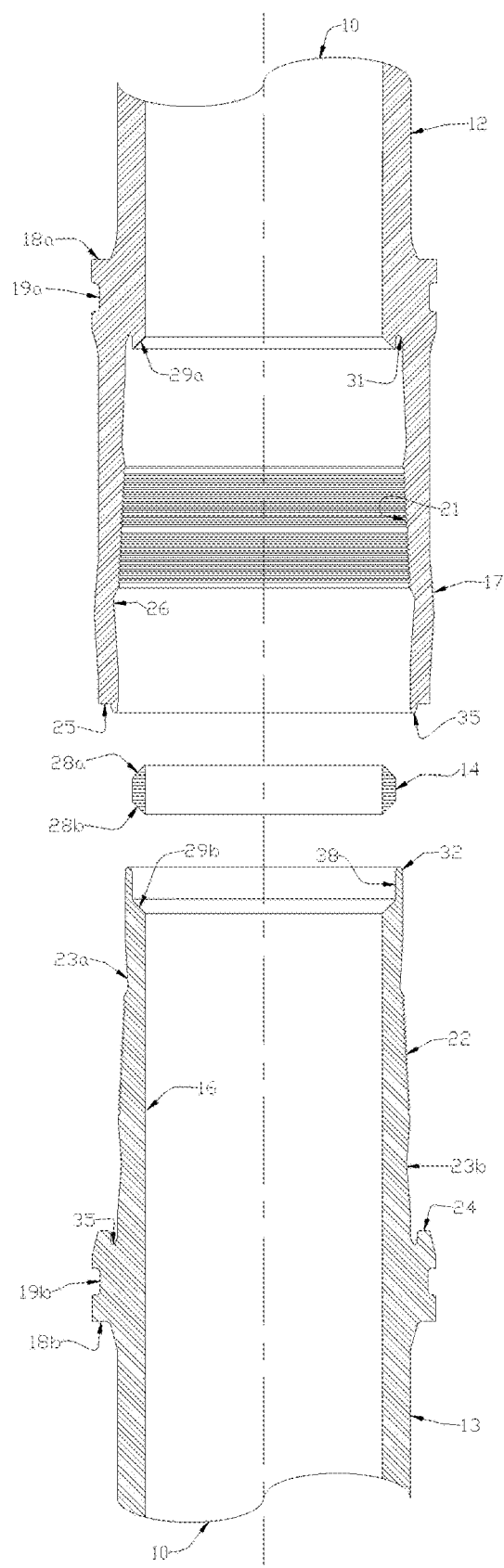
FIG. 5 is an exploded cross-sectional view of connector apparatus of FIG. 1.

FIGS. 8-12 depict a second embodiment of the present pin-and-box connector apparatuses. The embodiment of FIGS. 8-12 is substantially similar to the embodiment of FIGS. 1-7 (FIGS. 2 and 3 also depict portions 2-2 and 3-3 of the embodiment of FIG. 8), with the exception that seal ring 14a is shaped differently than seal ring 14, and corresponding surfaces 29c, 29d of box 15a and pin 16c, respectively, are shaped differently than surfaces 29a, 29b of box 15 and pin 16 (FIG. 9 depicts portion 9-9 of the embodiment of FIG. 8). As such, the differences will be described below with the understanding that the remaining features are substantially similar to those of the first embodiment of FIGS. 1-7.

More particularly, in the second embodiment, seal ring 14a includes an inner surface (facing the interior of pin 16 and pipe string 10) with a first width (e.g., an outer surface 39a that is parallel to the inner surface, and two lateral surfaces 28c, 28d that each perpendicular to the inner surface and outer surface (resulting in seal ring 14a having a substantially rectangular cross-sectional shape). In this embodiment, a fillet joins outer surface 39a and lateral surface 28d. In the embodiment shown, the connector has a nominal OD of 8⅝ inches, and the radial cross-section (as shown in FIG. 9) of seal ring 14a has a width of 0.75 inches and a thickness (between its inner and outer surfaces) of 0.57 inches. The dimensions of seal ring 14a may vary in other embodiments, such as, for example, those with larger-diameter connectors. In the depicted second embodiment, the corresponding surfaces 29c, 29d of box 15a and pin 16a, respectively, are also shaped to align with lateral surfaces 28c, 28d of seal 14a.

In addition to high strength fatigue resistant pipe connections for pipelines (e.g., risers), the present embodiments can be used to for high-efficiency, fatigue-resistant, tubular connections in structural connections.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A connector system comprising:
   a pin component defining a hollow interior region with a substantially constant first inner diameter (ID) between a proximal end of the pin component and a seal portion adjacent a distal end of the pin component, the pin component having a tapered exterior surface with a plurality of teeth, the seal portion having a second inner diameter (ID) that is larger than the first inner diameter (ID) of the pin component;
   a box component having a tapered interior surface with a plurality of teeth configured to engage the teeth of the pin component, the box component having an exterior surface that has a first portion having a substantially constant first outer diameter (OD) extending along a majority of the length of the box component, and a second contoured portion having a variable outer diameter (OD) that varies between the first portion and a distal end of the box component, wherein the seal portion of the pin component includes an annular, longitudinal protrusion with a radially inner surface defining the second inner diameter (ID), and wherein a proximal end of the box component includes an annular, longitudinal ID seal groove configured to receive the protrusion of the ID seal portion; and a seal ring having an outer diameter (OD) and configured to be disposed in the second inner diameter (ID) of the seal portion of the pin component such that in a mated configuration of the pin component and the box component, an outer surface of the seal ring, at the outer diameter (OD) of the seal ring, abuts an inner surface of the seal portion of the pin component at the second inner diameter (ID) of the seal portion of the pin component and the inner surface of the seal ring faces towards and borders on the interior hollow region.

2. The connector system of claim 1, where the seal ring includes an inner surface with a first width, and two angled lateral surfaces extending between the inner surface and the outer surface at the outer diameter (OD) of the seal ring.

3. The connector system of claim 2, where the lateral surfaces are at mirrored angles of equal magnitude relative to an axis that bisects each of the upper and lower surfaces.

4. The connector system of claim 1, where the seal ring includes an inner surface with a first width, the outer surface is parallel to the inner surface, and two lateral surfaces that are each perpendicular to the inner surface and outer surface.

5. The connector system of claim 4, where a fillet joins the outer surface and one of the lateral surfaces.

6. The connector system of claim 1, where the ID seal groove is configured to receive the protrusion of the ID seal portion with an interference fit.

7. The connector system of claim 1, where the distal end of box component includes an OD seal portion having a second OD that is smaller than the first OD of the box to define an annular, longitudinal protrusion.

8. The connector system of claim 7, where a proximal end of the pin component includes an annular, longitudinal OD seal groove configured to receive the protrusion of the OD seal portion.

9. The connector system of claim 8, where the OD seal groove is configured to receive the longitudinal protrusion of the OD seal portion with an interference fit.

10. The connector system of claim 1, where the variable OD of the second portion of the box component first increases with distance away from the first OD of the first portion of the box component to a maximum variable OD, and then decreases with further distance from the first OD of the first portion to a minimum variable OD.

11. The connector system of claim 10, where a sidewall of the box component along the portion in which the variable OD decreases has a substantially constant thickness between the maximum variable OD and the ID seal portion.

12. The connector system of claim 10, where the minimum variable OD is substantially equal to the first OD of the first portion of the box component.

13. The connector system of claim 12, where a sidewall of the box component along the portion in which the variable OD decreases has a substantially constant thickness between the maximum variable OD and the ID seal portion.

14. The connector system of claim 13, where the sidewall of the box component has a substantially constant thickness between the first OD and the ID seal portion.

15. The connector system of claim 1, where the plurality of teeth of each of the pin component and the box component comprise concentric, non-helical threads.

16. The connector system of claim 1, where the teeth of the pin component are configured to engage the teeth of the box component to attach the pin component to the box component.

17. The connector system of claim 16, where the teeth of the pin and box components are configured to be disengaged by pressurization between the external surface of the pin component and the internal surface of the box component.

18. The connector system of claim 17, further comprising:
a pressurization component configured to pressurize an interface between the exterior surface of the pin component and the interior surface of the box component.

19. The connector system of claim 1, where the distal end of box component includes an OD seal portion having a second OD that is smaller than the first OD of the box to define an annular, longitudinal protrusion.

20. The connector system of claim 19, where a proximal end of the pin component includes an annular, longitudinal OD seal groove configured to receive the protrusion of the OD seal portion.

21. The connector system of claim 20, where the OD seal groove is configured to receive the longitudinal protrusion of the OD seal portion with an interference fit.

22. The connector system of claim 1, where the variable OD of the second portion of the box component first increases with distance away from the first OD of the first portion of the box component to a maximum variable OD, and then decreases with further distance from the first OD of the first portion to a minimum variable OD.

23. The connector system of claim 22, where a sidewall of the box component along the portion in which the variable OD decreases has a substantially constant thickness between the maximum variable OD and the ID seal portion.

24. The connector system of claim 22, where the minimum variable OD is substantially equal to the first OD of the first portion of the box component.

25. The connector system of claim 24, where a sidewall of the box component along the portion in which the variable OD decreases has a substantially constant thickness between the maximum variable OD and the ID seal portion.

26. The connector system of claim 25, where the sidewall of the box component has a substantially constant thickness between the first OD and the ID seal portion.

27. The connector system of claim 1, where the plurality of teeth of each of the pin component and the box component comprise concentric, non-helical threads.

28. The connector system of claim 1, where the teeth of the pin component are configured to engage the teeth of the box component to attach the pin component to the box component.

29. The connector system of claim 28, where the teeth of the pin and box components are configured to be disengaged by pressurization between the external surface of the pin component and the internal surface of the box component.

30. The connector system of claim 29, further comprising:
a pressurization component configured to pressurize an interface between the exterior surface of the pin component and the interior surface of the box component.

* * * * *